United States Patent
O'Brien et al.

(10) Patent No.: US 7,036,597 B2
(45) Date of Patent: May 2, 2006

(54) SYSTEMS AND METHODS FOR TREATING A SUBTERRANEAN FORMATION USING CARBON DIOXIDE AND A CROSSLINKED FRACTURING FLUID

(75) Inventors: Crispin O'Brien, Calgary (CA); Kyong Joe Lee, Calgary (CA); Robert S. Taylor, Red Deer (CA); Phillip C. Harris, Duncan, OK (US)

(73) Assignees: Halliburton Energy Services, Inc., Duncan, OK (US); Anadarko Petroleum Corporation, The Woodlands, TX (US)

( * ) Notice: Subject to any disclaimer, the term of this patent is extended or adjusted under 35 U.S.C. 154(b) by 42 days.

(21) Appl. No.: 10/650,375

(22) Filed: Aug. 28, 2003

(65) Prior Publication Data

US 2005/0045335 A1    Mar. 3, 2005

(51) Int. Cl.
*E21B 43/26*    (2006.01)

(52) U.S. Cl. ............ 166/308.2; 166/300; 166/308.1; 166/308.5

(58) Field of Classification Search ............... 166/300, 166/308.1–308.6, 309; 507/202
See application file for complete search history.

(56) References Cited

U.S. PATENT DOCUMENTS

| 3,765,488 A | * | 10/1973 | Pence, Jr. ............... 166/308.6 |
| 4,480,696 A | | 11/1984 | Almond et al. |
| 4,541,935 A | * | 9/1985 | Constien et al. ............ 507/225 |
| 4,627,495 A | | 12/1986 | Harris et al. |
| 4,861,500 A | | 8/1989 | Hodge |
| 5,036,919 A | * | 8/1991 | Thomas et al. ............. 166/271 |
| 5,271,466 A | * | 12/1993 | Harms ........................ 166/300 |
| 5,360,558 A | * | 11/1994 | Pakulski et al. ............ 507/202 |
| 5,990,052 A | | 11/1999 | Harris |
| 6,439,310 B1 | * | 8/2002 | Scott et al. .............. 166/308.1 |
| 6,454,008 B1 | | 9/2002 | Chatterji et al. |

OTHER PUBLICATIONS

"Dynamic Fluid-Loss Characteristics of $CO_2$-Foam Fracturing Fluids," SPE Production Engineering, May 1987, Phillip C. Harris.
"Chemistry and Rheology of Borate-Crosslinked Fluids at Temperatures to 300° F," Journal of Petroleum Technology Mar. 1993, , Phillip C. Harris.
"Successful Field Applications of $CO_2$-Foam Fracturing Fluids in the Arkansas-Louisiana-Texas Region," Journal of Petroleum Technology 1985, W.E. Warnock, P.C. Harris, and D.S. King.
Foreign Search Report and Opinion (PCT Appl. No. GB2004/027735), Jan. 13, 2005.

* cited by examiner

*Primary Examiner*—David Bagnell
*Assistant Examiner*—Giovanna M. Collins
(74) *Attorney, Agent, or Firm*—Robert A. Kent; Baker Botts

(57) ABSTRACT

The present invention relates to fluid systems comprising a first fluid comprising carbon dioxide and a second fluid comprising an alkaline crosslinked fluid. The fluid combinations of the present invention may be used, for example, in hydraulic fracturing, frac-packing, and gravel packing. Some embodiments of the present invention provide systems for treating a subterranean formation comprising a first fluid comprising a foamed carbon dioxide fluid, an emulsion of carbon dioxide, or a carbon dioxide gel; and, a second fluid comprising an alkaline crosslinked fluid.

13 Claims, No Drawings

SYSTEMS AND METHODS FOR TREATING A SUBTERRANEAN FORMATION USING CARBON DIOXIDE AND A CROSSLINKED FRACTURING FLUID

1. FIELD OF THE INVENTION

The present invention relates to fluid systems comprising a first fluid comprising carbon dioxide and a second fluid comprising an alkaline crosslinked fluid. The fluid combinations of the present invention may be used, for example, in hydraulic fracturing, frac-packing, and gravel packing.

2. DESCRIPTION OF THE PRIOR ART

Viscous gelled fluids are commonly used in the hydraulic fracturing of subterranean zones to increase the production of hydrocarbons from the subterranean zones. That is, a viscous fracturing fluid is pumped through a well bore into a subterranean zone to be stimulated at a rate and pressure such that fractures are formed or extended into the subterranean zone. The fractures propagate as vertical and/or horizontal cracks radially outward from the well bore.

Viscous gelled fluids are also used in the sand control operations such as gravel packing. One common type of gravel packing operation involves placing a gravel pack screen in the well bore and packing the surrounding annulus between the screen and the well bore with gravel of a specific size designed to prevent the passage of formation sand. The gravel pack screen is generally a filter assembly used to retain the gravel placed during gravel pack operation. A wide range of sizes and screen configurations are available to suit the characteristics of the gravel pack sand used. Similarly, a wide range of sizes of gravel is available to suit the characteristics of the unconsolidated or poorly consolidated particulates in the subterranean formation. The resulting structure presents a barrier to migrating sand from the formation while still permitting fluid flow. When installing the gravel pack, the gravel is carried to the formation in the form of a slurry by mixing the gravel with a transport fluid. Gravel packs act, inter alia, to stabilize the formation while causing minimal impairment to well productivity. The gravel, inter alia, acts to prevent the particulates from occluding the screen or migrating with the produced fluids, and the screen, inter alia, acts to prevent the gravel from entering the production tubing.

Such viscous fluids may carry particulate material, such as gravel or proppant. When used, the particulate material is suspended in the fluid so that it is deposited in the fractures or along the gravel pack when the viscous fluid is broken and recovered. When used in a fracturing operation, the particulate material functions to prevent the fractures from closing and thus aids in forming conductive channels through which produced fluids can flow to the well bore. Without the particulate material, the fractures may tend to close and any increased permeability gained by the fracturing operation might be lost. Suitable particulate materials must have sufficient compressive strength to resist crushing, but also must be sufficiently non-abrasive and non-angular to preclude cutting and imbedding into the formation.

After the viscous fluid has been pumped into a subterranean zone in a formation and fracturing of the zone has substantially taken place or the gravel pack has been substantially installed, the viscous fluid is removed from the formation. Generally, the removal of the viscous fluid is accomplished by converting it into a low viscosity fluid. This has been accomplished by adding a delayed breaker, i.e., a viscosity reducing agent, to the viscous fluid prior to pumping it into the subterranean zone. Examples of delayed breakers that can be used include, but are not limited to, enzymes, acids and oxidizing agents.

A common viscous fluid is made with guar derivatives and crosslinked to increase its viscosity. Borate compounds are commonly used as crosslinking agents to create viscous fracturing fluids. Common borate crosslinked fluids comprise polysaccharide polymers crosslinked with borate salts. Such crosslinked fluids generally must be alkaline (generally above about pH 8) to retain their crosslinked character. That is, if the pH of such a crosslinked fluid falls below about 8, the fluid reverses its crosslink and reduces in viscosity. These fluids are referred to herein as "alkaline crosslinked fluids."

In carrying out hydraulic fracturing and gravel packing, fluid recovery is critical. Foamed fluids have been developed in part to provide enhanced fluid recovery through energization by the compressed gas phase. They also reduce the total amount of water used, typically by a factor of about four. Such foamed fluids have included various surfactants, known as foaming and foam stabilizing agents, for facilitating the foaming and stabilization of the foam produced when a gas is mixed with the fracturing fluid. Thus, foamed fluids are media in which a relatively large volume of gas is dispersed in a relatively small volume of liquid, usually with the aid of a surfactant that reduces the surface tension of the fluids. The most commonly used gases for foamed fracture fluids are nitrogen, carbon dioxide, and combinations of the two. Such gases generally are non-combustible, readily available, and relatively inexpensive. Carbon dioxide foams may be preferred based on the fact that their use results in little or no loss of hydrostatic pressure since, inter alia, carbon dioxide foam has a density close to water and thus does not bleed off to the extent a lower density foam, such as a nitrogen foam, might. Moreover, particularly in dry gas reservoirs, the higher density carbon dioxide fluid may be more effective at displacing the load water from the subterranean formation rather than the formation dry gas.

Foamed fluids may be preferred over conventional liquid viscous fluids because they generally provide superior fluid recovery as well as excellent fluid loss control without forming a substantial filter cake. When used in fracturing, foamed fluids generally propagate longer and narrower fractures that remain in the producing zone and are believed to provide superior production enhancement through reduced fracture conductivity damage. Enhanced fluid recovery is provided by the expansion of the gas in the foam when the hydraulic pressure is released after the fracturing operation. This promotes flow of residual fracture fluid liquid back into the well, thus aiding in cleanup of the fracture fluid once the subterranean treatment is complete.

Fracturing techniques using foamed fluids having carbon dioxide as at least part of the gas phase are known in the art. In one common embodiment, a gelled aqueous fluid comprising a surfactant, inter alia, to stabilize the foam, is mixed with liquid carbon dioxide at the surface of the well. The mixture, which is initially an emulsion, generally forms foam as it proceeds down the well bore to the formation to be fractured as the mixture warms to a temperature above the critical temperature of carbon dioxide (87.8° F. [31° C.]). Where the down hole temperature is not above the critical temperature of carbon dioxide, the mixture remains an emulsion. Both carbon dioxide emulsions and foams are suitable for use as fracturing fluids.

Carbon dioxide foams and emulsions have deeper well capability than nitrogen foams. Carbon dioxide emulsions have greater density than nitrogen gas foams so that the surface pumping pressure required to reach a corresponding depth is lower with carbon dioxide than with nitrogen. When exposed to water, carbon dioxide reacts to form carbonic acid, so that carbon dioxide foams and emulsions generally exhibit a pH in the range of from about 2 to about 6. The low pH exhibited by carbon dioxide fracturing fluids has lead to a belief in the art that they are unsuitable for use with alkaline crosslinked fluids.

SUMMARY OF THE INVENTION

The present invention relates to fluid systems comprising a first fluid comprising carbon dioxide and a second fluid comprising an alkaline crosslinked fluid. The fluid combinations of the present invention may be used, for example, in hydraulic fracturing, frac-packing, and gravel packing.

Some embodiments of the present invention provide methods of fracturing a subterranean formation comprising the steps of placing a first fluid comprising a foamed carbon dioxide fluid, an emulsion of carbon dioxide, or a carbon dioxide gel into a subterranean formation at a pressure sufficient to create or extend at least one fracture therein; placing a second fluid comprising an alkaline crosslinked fluid into the subterranean formation at a pressure sufficient to cause the second fluid to enter the fracture created or extended by the first fluid; and, releasing the pressure on the subterranean formation and thereby allowing the first fluid to intermix with the second fluid wherein the first fluid lowers that pH of the second fluid and causes the second fluid to reduce viscosity.

Other embodiments of the present invention provide methods of gravel packing along a well bore comprising the steps of placing a first fluid comprising a foamed carbon dioxide fluid, an emulsion of carbon dioxide, or a carbon dioxide gel into a well bore at a pressure sufficient to penetrate into the formation; placing a second fluid comprising particulates and an alkaline crosslinked fluid into the subterranean formation so as to form a gravel pack along the well bore; and, releasing the pressure and thereby allowing the first fluid to intermix with the second fluid wherein the first fluid lowers that pH of the second fluid and causes the second fluid to reduce viscosity.

Still other embodiments of the present invention provide systems for treating a subterranean formation comprising a first fluid comprising a foamed carbon dioxide fluid, an emulsion of carbon dioxide, or a carbon dioxide gel; and, a second fluid comprising an alkaline crosslinked fluid.

Other and further objects, features and advantages of the present invention will be readily apparent to those skilled in the art upon a reading of the description of preferred embodiments which follows.

DESCRIPTION OF PREFERRED EMBODIMENTS

The present invention relates to fluid systems comprising a first fluid comprising carbon dioxide and a second fluid comprising an alkaline crosslinked fluid. The fluid combinations of the present invention may be used, for example, in hydraulic fracturing, frac-packing, and gravel packing.

Some embodiments of the present invention provide methods of fracturing a subterranean formation whereby a first fluid comprising carbon dioxide is placed into a subterranean formation at a pressure sufficient to create or extend at least one fracture therein. Next, a second fluid that comprises an alkaline crosslinked fluid is placed into the formation at a pressure sufficient to cause the second fluid to enter the fracture created or extended by the first fluid. Next, the pressure on the subterranean formation is released, thereby allowing the first fluid to intermix with the second fluid. When the carbon dioxide in the first fluid contacts the second fluid, it lowers the second fluid's pH and causes crosslinking in the second fluid to be at least partially reversed, resulting in a decrease in viscosity.

Other embodiments of the present invention provide methods of gravel packing whereby a first fluid comprising carbon dioxide is placed into a well bore under pressure. The first fluid is allowed to penetrate into the near well bore formation where it may act, inter alia, as a fluid loss control agent. While the pressure is maintained, a second fluid comprising an alkaline crosslinked fluid and gravel particles is placed into the well bore. The gravel particles are substantially left in the well bore to create a gravel pack and then the pressure is released. When the pressure releases, the carbon dioxide in the first fluid is released; at which point it contacts the alkaline crosslinked fluid. When the carbon dioxide in the first fluid contacts the second fluid, it lowers the second fluid's pH and causes crosslinking in the second fluid to be at least partially reversed, resulting in a decrease in viscosity.

First fluids suitable for use in the methods of the present invention include foams, emulsions, and gels comprising carbon dioxide. When used in fracturing and frac-packing, the first fluid is placed into the subterranean formation at a pressure sufficient to form or enhance at least one fracture within the formation. When used in gravel packing, the first fluid is placed into the subterranean formation at a pressure sufficient to penetrate a distance into the sides of the well bore. In some embodiments of the present invention, the first fluid is a foamed carbon dioxide fracturing fluid known in the art. Such foams are known to produce desirable long, narrow fractures into the producing zone and to minimize fluid loss. Mixed gas foams blending nitrogen and carbon dioxide also may be suitable so long as they contain sufficient carbon dioxide to produce an acidic pH.

In the fracturing and frac-packing methods of the present invention, once a fracture is formed or enhanced, a second fluid is placed into the formation and the fracture while the pressure is maintained. In the gravel packing methods of the present invention, once the first fluid is introduced to the well bore, a second fluid is placed into the well bore while the pressure is maintained. Second fluids suitable for use in the present invention include alkaline crosslinked fluids known in the art. Such alkaline crosslinked fluids are generally formed from viscosified fluids that are crosslinked with a crosslinking agent that maintains a crosslink at a pH of above about 8.

A variety of viscosifying agents can be used to create the underlying viscosified fluid to be crosslinked, including hydratable polymers that contain one or more functional groups such as hydroxyl, cis-hydroxyl, carboxyl, sulfate, sulfonate, amino or amide and quartemary amines. Particularly useful are polysaccharides and derivatives thereof that contain one or more of the monosaccharide units, including but not limited to galactose, mannose, glucoside, glucose, xylose, arabinose, fructose, glucuronic acid or pyranosyl sulfate. Examples of natural hydratable polymers containing the foregoing functional groups and units that are particularly useful in accordance with the present invention include guar gum and derivatives thereof such as hydroxypropyl guar and cellulose derivatives, such as carboxy methyl hydroxyethyl cellulose or carboxy methyl cellulose. Hydratable synthetic polymers and copolymers that contain the above-mentioned functional groups also can be used. Examples of such synthetic polymers include, but are not limited to, polyacrylate, polymethacrylate, polyacrylamide, polyvinyl alcohol and polyvinylpyrrolidone. The viscosifying agent used is generally combined with the water in the fracturing fluid in an amount in the range of from about 0.01% to about 2% by weight of the water. Such viscosified fluids may then be crosslinked to create alkaline crosslinked fluids using crosslinking agents such as, for example, alkali metal borates, borax, boric acid, and compounds that are capable of releasing borate ions in aqueous solutions.

According to the methods of the present invention, particulates (such as gravel and proppant) may be suspended in the first fluid, the second fluid, or both. In some embodiments of the present invention, only the second fluid comprises proppant particles. Particulates used in accordance with the present invention are generally of a size such that formation particulates that may migrate with produced fluids are prevented from being produced from the subterranean zone. Any suitable particulate may be used, including graded sand, bauxite, ceramic materials, glass materials, walnut hulls, polymer beads and the like. Generally, the particulates have a size in the range of from about 4 to about 400 mesh, U.S. sieve series. In some embodiments of the present invention, the particulate is graded sand having a particle size in the range of from about 10 to about 70 mesh, U.S. Sieve Series, and more preferable from about 16 to about 40 mesh.

When the second fluid is placed in the subterranean formation under pressure, generally it displaces the first fluid further into the subterranean formation but does not substantially mix with the first fluid. The disparate viscosities of the two fluids and substantially laminar flow conditions helps minimize mixing while the second fluid is being placed. This separation, inter alia, of the two fluids allows for the use of an acidic first fluid with an alkaline crosslinked second fluid.

If the hydraulic pressure is maintained, the first and second fluids remain essentially unmixed, but once it is released the two fluids intermix. When the hydraulic pressure is released the carbon dioxide in the first fluid may attempt to reach pressure equilibrium by flowing towards the lower pressure in the well bore and the surface, resulting in the carbon dioxide flowing through the second fluid. This intermixing has two effects. First, as the carbon dioxide attempts to return to the surface of the well it provides energy towards removing some or all of both the first and second fluid from the well bore, a necessary step that occurs before the well is placed on production. Second, as the acidic carbon dioxide first fluid intermixes with the alkaline second fluid, it causes at least some of the second fluid's crosslinkages to reverse and thus the viscosity of the second fluid is reduced. In fact, when as little as about 2% by volume carbon dioxide is added to an alkaline crosslinked fluid, the fluid reverts to an uncrosslinked viscosity.

By beginning the subterranean treatment with a carbon dioxide foam, rather than just using an alkaline crosslinked fluid, the methods of the present invention are able to more effectively maintain the net pressure in the subterranean formation due to, inter alia, the expansive nature of the carbon dioxide gas in the foam. Maintaining the formation pressure in the case of a fracturing treatment may help prevent fracture width reduction and thus may help prevent screenout, particularly in cases where the formation is fractured through a barrier. Moreover, by initiating the treatment with the acidic carbon dioxide foam, the low pH fluid that leaks off into the formation may help improve clay compatibility in the reservoir. In particular, it is known that kaoline clays are less subject to mobility within the formation, and thus, less likely to clog production pores and piping, at lower a pH.

Some embodiments of the present invention provide methods of fracturing a subterranean formation whereby a first fluid comprising carbon dioxide is placed into a subterranean formation at a pressure sufficient to create or extend at least one fracture therein. Next, an alkaline crosslinked fluid is placed into the formation at a pressure sufficient to cause the second fluid to enter the fracture created or extended by the first fluid. Next, the pressure on the subterranean formation is released, thereby allowing the first fluid to intermix with the second fluid. One skilled in the art will recognize that the fracturing methods described above may also be used in a "frac packing" operation wherein the fracture operation is allowed to screenout and form a gravel pack in conjunction with a proppant filled fracture.

Other embodiments of the present invention provide methods of gravel packing whereby a first fluid comprising carbon dioxide is placed into a well bore under pressure. The carbon dioxide foam is allowed to penetrate into the near well bore formation where it may act, inter alia, as a fluid loss control agent. While the pressure is maintained, a second fluid comprising an alkaline crosslinked fluid and gravel particles is placed into the well bore. The gravel particles are substantially left in the well bore to create a gravel pack and then the pressure is released. When the pressure releases, the carbon dioxide that entered the formation is released; at which point it contacts the alkaline crosslinked fluid.

To facilitate a better understanding of the present invention, the following examples of some of the preferred embodiments are given. In no way should such examples be read to limit the scope of the invention.

EXAMPLES

A laboratory bench test was performed by first preparing an uncrosslinked base alkaline fluid in a Waring Blendor with 30 lb/Mgal guar powder, hydrated in water with 2.7% $KNO_3$ (yielding an equivalent ionic strength of about 2% KCl). The viscosity of the base fluid was measured with a Fann 35 viscometer to be 19 cP@511 $sec^{-1}$. A foaming surfactant, cocoamido betaine, was then added at 0.5%. Borate crosslinker (equivalent to 6 lb/Mgal boric acid) was added to the guar to produce a crosslinked gel at pH 8.5. The crosslinked gel fluid was put into a recirculating flow loop viscometer and pressurized to 900 psi and 75° F. The viscosity of the crosslinked borate gel was measured as 120 cP at 511 $sec^{-1}$. Liquid carbon dioxide gas then was pumped into the flow loop while the crosslinked gel fluid was circulating at 511 $sec^{-1}$. Once about 2% carbon dioxide by volume of crosslinked gel fluid had been added, the viscosity of the fluid was measured to be about 16 cP at 511 $sec^{-1}$ and the pH of the fluid dropped to below 6.

This test shows the initial viscosity of a guar polymer fluid to be about 19 cP, and the crosslinked viscosity of the same fluid to be about 120 cP with an alkaline pH. Subjecting the alkaline crosslinked fluid to carbon dioxide caused the alkaline crosslinked fluid to became acidic, reverse its crosslink and revert to a viscosity close to that of the base, uncrosslinked, fluid.

Therefore, the present invention is well adapted to carry out the objects and attain the ends and advantages mentioned as well as those that are inherent therein. While numerous changes may be made by those skilled in the art, such changes are encompassed within the spirit and scope of this invention as defined by the appended claims.

What is claimed is:

1. A method of fracturing a subterranean formation comprising the steps of:
    placing an uncrosslinked first fluid chosen from the group consisting of a foamed carbon dioxide fluid, an emulsion of carbon dioxide, or a carbon dioxide gel into a subterranean formation at a pressure sufficient to create and extend at least one fracture therein;
    placing a second fluid comprising an alkaline crosslinked fluid into the subterranean formation at a pressure sufficient to cause the second fluid to enter the fracture created or extended by the first fluid; and,
    releasing the pressure on the subterranean formation and thereby allowing the uncrosslinked first fluid to intermix with the second fluid wherein the first fluid lowers that pH of the second fluid and causes a viscosity of the second fluid to reduce.

2. The method of claim 1 wherein the second fluid's crosslinkages are reversed at a pH below about 8.

3. The method of claim 1 wherein the second fluid comprises a hydratable polymer.

4. The method of claim 1 wherein the alkaline crosslinked fluid is crosslinked with a crosslinking agent selected from the group consisting of: alkali metal borates, borax, boric acid, and borate ions.

5. The method of claim 1 wherein the second fluid comprises a guar or guar derivative fracturing fluid crosslinked with a borate crosslinking agent.

6. The method of claim 1 wherein the second fluid further comprises proppant.

7. A method of gravel packing along a well bore in a subterranean formation comprising the steps of:
    placing an uncrosslinked first fluid chosen from the group consisting of a foamed carbon dioxide fluid, an emulsion of carbon dioxide, and a carbon dioxide gel into a well bore at a pressure sufficient to penetrate into the subterranean formation;
    placing a second fluid comprising particulates and an alkaline crosslinked fluid into the subterranean formation so as to form a gravel pack along the well bore;
    releasing the pressure and thereby allowing the uncrosslinked first fluid to intermix with the second fluid so that pH of the second fluid is reduced; and
    allowing a viscosity of the second fluid to reduce.

8. The method of claim 7 wherein the second fluid's crosslinkages are reversed at a pH below about 8.

9. The method of claim 7 wherein the second fluid comprises a hydratable polymer.

10. The method of claim 7 wherein the alkaline crosslinked fluid is crosslinked with a crosslinking agent selected from the group consisting of:
    alkali metal borates, borax, boric acid, and borate ions.

11. The method of claim 7 wherein the second fluid comprises a guar or guar derivative fracturing fluid crosslinked with a borate crosslinking agent.

12. The method of claim 7 wherein the first fluid initiates fractures in the formation during the step of placing the first fluid in the formation.

13. The method of claim 12 wherein the second fluid widens or extends the fractures of the formation during the step of placing the second fluid in the formation.

* * * * *